(12) United States Patent
Hoshino et al.

(10) Patent No.: US 9,012,565 B2
(45) Date of Patent: Apr. 21, 2015

(54) WATER/OIL REPELLENT AGENT AND WATER/OIL REPELLENT COMPOSITION

(75) Inventors: Taiki Hoshino, Tokyo (JP); Naoko Shirota, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 674 days.

(21) Appl. No.: 13/333,374

(22) Filed: Dec. 21, 2011

(65) Prior Publication Data

US 2012/0085960 A1 Apr. 12, 2012

Related U.S. Application Data

(63) Continuation of application No. PCT/JP2010/060313, filed on Jun. 17, 2010.

(30) Foreign Application Priority Data

Jun. 24, 2009 (JP) ................................. 2009-150022

(51) Int. Cl.
 *C08G 18/28* (2006.01)
 *C08G 18/76* (2006.01)
 *C09K 3/18* (2006.01)

(52) U.S. Cl.
 CPC ........ *C08G 18/2825* (2013.01); *C08G 18/2885* (2013.01); *C08G 18/7664* (2013.01); *C08G 18/7671* (2013.01); *C09K 3/18* (2013.01)

(58) Field of Classification Search
 CPC ........... C08G 18/2825; C08G 18/2885; C08G 18/7671; C08G 18/7664; C09K 3/18
 USPC ..................................... 524/590; 528/67, 69
 See application file for complete search history.

(56) References Cited

U.S. PATENT DOCUMENTS

| 5,411,766 A | 5/1995 | Kirchner |
| 5,580,645 A | 12/1996 | Kirchner |
| 8,754,183 B2 * | 6/2014 | Hoshino ........................ 528/70 |

FOREIGN PATENT DOCUMENTS

| JP | 58-189284 | 11/1983 |
| JP | 62-181385 | 8/1987 |
| JP | 04-211489 | 8/1992 |
| JP | 04-361693 | 12/1992 |
| JP | 06-033044 | 2/1994 |
| WO | WO2006/013791 | 2/2006 |
| WO | WO 2007/002894 | 1/2007 |
| WO | WO 2007/026716 | 3/2007 |

OTHER PUBLICATIONS

International Search Report issued Aug. 24, 2010 in PCT/JP2010/060313 filed Jun. 17, 2010.
U.S. Appl. No. 13/693,654, filed Dec. 4, 2012, Hoshino.

* cited by examiner

*Primary Examiner* — Edward Cain
(74) *Attorney, Agent, or Firm* — Oblon, McClelland, Maier & Neustadt, L.L.P.

(57) ABSTRACT

To provide a water/oil repellent agent and a water/oil repellent composition which is capable of providing an article surface with a sufficient water/oil repellency, while placing little burden on the environment.

One comprising a reaction product obtained by reacting a fluoromonool having a polyfluoroalkyl moiety having at most 6 carbon atoms as an alcohol, an alkane monool having at least 18 carbon atoms, and MDI or a polymeric MD, and by treating an article with such a water/oil repellent agent, a sufficient water/oil repellency can be imparted, while placing little burden on the environment. By treating the above-mentioned article with the water/oil repellent composition of the present invention, a high quality water/oil repellency can be imparted to the article.

18 Claims, No Drawings

WATER/OIL REPELLENT AGENT AND WATER/OIL REPELLENT COMPOSITION

TECHNICAL FIELD

The present invention relates to a water/oil repellent agent and a water/oil repellent composition.

BACKGROUND ART

As a method for imparting water/oil repellency to the surface of an article (such as a fiber product), a method of treating the article by means of a water/oil repellent composition composed of a solution having dissolved in or an emulsion having dispersed in a medium, a fluorinated compound having various polyfluoroalkyl groups (a polyfluoroalkyl group will be hereinafter referred to as a $R^f$ group), particularly a fluorourethane compound or a fluoropolymer, has been known.

In Patents Documents 1 and 2, as a fluorourethane compound having an $R^f$ group, a fluorourethane compound which is a reaction product of a polyisocyanate and a fluoroalcohol having an $R^f$ group having at least 8 carbon atoms (including other alcohols) has been used.

However, recently, EPA (US Environmental Protection Agency) has pointed out that a compound having a perfluoroalkyl group (a perfluoroalkyl group will be hereinafter referred to as a $R^F$ group) having at least 8 carbon atoms is likely to be decomposed in the environment or in vivo, and the decomposition product is likely to be accumulated, i.e. it presents a high environmental impact. Therefore, a water/oil repellent composition has been required which has an $R^F$ group having at most 6 carbon atoms.

Patent Document 3 discloses a fluorourethane compound which is a reaction product of a fluoroalcohol having an $R^F$ group having 4 carbon atoms and a sulfonyl group, and a polyisocyanate, for reducing the environmental impact. However, the water/oil repellency of articles treated with a water/oil repellent composition comprising the above reaction product is insufficient.

Patent Document 4 discloses a urethane compound which is formed by a reaction of a fluoroacryl oligomer having an $R^F$ group having at most 4 carbon atoms and a hydroxyl group at its terminal, and a polyisocyanate. For the production of the urethane compound, two steps are required: a step of polymerization for forming an oligomer having a functional group which is reactive to an isocyanate at a terminal and a step of reacting the oligomer and an isocyanate. Thus, such a production process is complicated.

PRIOR ART DOCUMENTS

Patent Documents

Patent Document 1: JP-A-58-189284
Patent Document 2: JP-A-62-181385
Patent Document 3: WO06/013791
Patent Document 4: WO07/002894

DISCLOSURE OF INVENTION

Technical Problem

It is an object of the present invention to provide a water/oil repellent composition which can impart a sufficient water/oil repellency to a surface of an article and of which environmental impact is low, and a water/oil repellent composition.

Solution to Problem

The present invention provides the following water/oil repellent agent, method for producing the water/oil repellent agent and water/oil repellent composition.

(1) A water/oil repellent agent which comprises a reaction product of isocyanate group-reactive compounds containing the following compound (a) and the following compound (b) with the following compound (d):

compound (a): a fluoromonool having a polyfluoroalkyl moiety having at most 6 carbon atoms, compound (b): an alkane monool having at least 18 carbon atoms, compound (d): at least one polyisocyanate selected from the group consisting of diphenylmethane diisocyanate and a polymethylenepolyphenyl polyisocyanate.

(2) The water/oil repellent agent according to (1), wherein the molar ratio of the total of the compound (a) and the compound (b) to the total amount of the isocyanate group-reactive compounds is from 0.6 to 1.

(3) The water/oil repellent agent according to (1) or (2), wherein the molar ratio of the compound (a) to the total amount of the compound (a) and the compound (b) is from 0.2 to 0.8.

(4) The water/oil repellent agent according to any one of (1) to (3), wherein the reaction product is a reaction product having no isocyanate group.

(5) The water/oil repellent agent according to any one of (1) to (4), wherein the compound (a) is at least one polyfluoroalkane monool having a $C_{4-6}$ perfluoroalkyl moiety.

(6) The water/oil repellent agent according to any one of (1) to (5), wherein the compound (b) is at least one $C_{20-24}$ linear alkane monool.

(7) The water/oil repellent agent according to any one of (1) to (6), wherein the compound (d) is a polymethylenepolyphenyl polyisocyanate having an isocyanate group content of from 30 to 33 mass %.

(8) The water/oil repellent agent according to any one of (1) to (7), wherein an isocyanate group-reactive compound other than the compound (a) and the compound (b) is the following compound (c):

compound (c): a compound having one alcoholic hydroxyl group or amino group.

(9) A method for producing the water/oil repellent agent as defined in any one of (1) to (8), wherein the compound (d) is reacted to the isocyanate group-reactive compounds sequentially or to a mixture containing the isocyanate group-reactive compounds.

(10) A water/oil repellent composition comprising the water/oil repellent agent as defined in any one of (1) to (8) and a liquid medium.

Advantageous Effects of Invention

Since the water/oil repellent agent of the present invention does not contain a perfluoroalkyl group having at least 8 carbon atoms, PFOA is not generated, the water/oil repellent agent of the present invention is safe, the environmental impact is low, and sufficient water/oil repellency can be imparted to a surface of an article.

The water/oil repellent composition of the present invention can impart sufficient water/oil repellency to a surface of an article and has a low environmental impact.

According to the method for producing a water/oil repellent composition of the present invention, it is possible to produce a water/oil repellent agent which is capable of imparting sufficient water/oil repellency to a surface of an article and which presents a low environmental impact.

DESCRIPTION OF EMBODIMENTS

The water/oil repellent agent of the present invention is a fluorourethane compound comprising a reaction product of isocyanate group-reactive compounds containing the following compound (a) and the following compound (b) with the following compound (d). The compound (a) in the present invention is a fluoromonool represented by the following formula (1), and two or more such fluoromonools may be used:

$$R^f\text{—}Y\text{—}OH \qquad (1).$$

Here, $R^f$ is a $C_{1-6}$ polyfluoroalkyl group, and Y is a bivalent organic group or a single bond. The polyfluoroalkyl group is an alkyl group of which the majority of hydrogen atoms are substituted by fluorine atoms, and a fluorine atom is preferably bonded to a carbon atom at a terminal of Y side. $R^f$ is preferably a perfluoroalkyl group ($R^F$) wherein all hydrogen atoms bonded to carbon atoms are substituted by fluorine atoms, more preferably a $C_{4-6}$ linear perfluoroalkyl group. Here, when $R^f$ is a linear $R^F$, Y is not a single bond.

The bivalent organic group is a group having at least 1 carbon atom. The bivalent organic group is a bivalent organic group having a carbon atom (except for a carbon atom of an aromatic nucleus) at a terminal on a side bonded to the hydroxyl group and having no fluorine atom, and the bivalent organic group may have a coupling group such as —O—, —NR$^1$— (wherein R$^1$ is a hydrogen atom or a $C_{1-4}$ alkyl group), —CO—, —S— or —SO$_2$—. The bivalent organic group is preferably an alkylene group, an alkenylene group or an alkylene group having the above coupling group at an $R^f$ side terminal or between carbon atoms. Y is preferably a $C_{1-6}$ linear or branched alkylene group or —CR$^2$=CR$^3$— (wherein each of R$^2$ and R$^3$ which are independent of each other is hydrogen atom or a methyl group), particularly preferably a $C_{2-4}$ polymethylene group.

As Y, the following groups may be mentioned.
—(CH$_2$)$_n$—,
—CH$_2$CH$_2$CH(CH$_3$)—,
—CH=CHCH$_2$—,
—S(CH$_2$)$_n$—,
—SO$_2$(CH$_2$)$_n$—,
—(CH$_2$)$_n$S(CH$_2$)$_n$—,
—(CH$_2$)$_n$SO$_2$(CH$_2$)$_n$—,
—CON(R$^1$)(CH$_2$)$_n$— and
—SO$_2$N(R$^1$)(CH$_2$)$_n$—.

Here, R$^1$ is as defined above, and n is 1 to 12.

Specifically, $C_4F_9CH_2OH$, $C_5F_{11}CH_2OH$, $C_6F_{13}CH_2OH$, $C_4F_9C_2H_4OH$, $C_5F_{11}C_2H_4OH$, $C_6F_{13}C_2H_4OH$, $C_4F_9C_3H_6OH$, $C_5F_{11}C_3H_6OH$, $C_6F_{13}C_3H_6OH$, $C_4F_9SC_2H_4OH$, $C_5F_{11}SC_2H_4OH$, $C_6F_{13}SC_2H_4OH$, $C_4F_9SO_2C_2H_4OH$, $C_5F_{11}SO_2C_2H_4OH$, $C_6F_{13}SO_2C_2H_4OH$, $C_4F_9C_2H_4SC_2H_4OH$, $C_5F_{11}C_2H_4SC_2H_4OH$, $C_6F_{13}C_2H_4SC_2H_4OH$, $C_4F_9C_2H_4SO_2C_2H_4OH$, $C_5F_{11}C_2H_4SO_2C_2H_4OH$, $C_6F_{13}C_2H_4SO_2C_2H_4OH$, $C_4F_9CON(CH_3)C_2H_4OH$, $C_5F_{11}CON(CH_3)C_2H_4OH$, $C_6F_{13}CON(CH_3)C_2H_4OH$, $C_4F_9SO_2N(CH_3)C_2H_4OH$, $C_5F_{11}SO_2N(CH_3)C_2H_4OH$ or $C_6F_{13}SO_2N(CH_3)C_2H_4OH$ may, for example, be mentioned.

The compound (a) in the present invention is preferably $F(CF_2)_4$—$(CH_2)_2$—OH or $F(CF_2)_6$—$(CH_2)_2$—OH, or a mixture of such compounds may be used. Among them, a monool having a perfluoro(n-hexyl) group is particularly preferred. In the case of a mixture, a mixture containing at least 50 mass % of the monool having a perfluoro(n-hexyl) group is preferred.

The compound (b) in the present invention is an alkane monool having at least 18 carbon atoms, and at least 2 types of such a compound (b) may be used. The alkyl group may be linear or branched. For example, $CH_3(CH_2)_{17}OH$ (stearyl alcohol), $(CH_3)_2CH(CH_2)_{15}OH$, $CH_3(CH_2)_{19}OH$ or $CH_3(CH_2)_{21}OH$ (behenyl alcohol) may be mentioned. Particularly, a $C_{20-24}$ linear alkane monool is preferred.

The isocyanate group-reactive compounds in the present invention may contain a compound (c) which is a compound having reactivity to an isocyanate group, in addition to the compound (a) and the compound (b). Independent of the presence of the compound (c), the molar ratio of the compound (a) to the total amount of the compound (a) and the compound (b) in the isocyanate group-reactive compounds is preferably from 0.2 to 0.8, particularly preferably from 0.4 to 0.75. Further, the molar ratio of the total of the compound (a) and the compound (b) to the total amount of the isocyanate group-reactive compounds is preferably from 0.6 to 1, particularly preferably from 0.8 to 1.

Further, the compound (c) may be a compound having a relatively high molecular weight. In such a case, even though the molar ratio is low, the mass ratio is high, and the properties of the water/oil repellent agent may be impaired. Thus, the mass ratio of the compound (c) to the total amount of the isocyanate group-reactive compounds is preferably at most 30 mass %, particularly preferably at most 20 mass %. Further, the compound (c) may have at least 2 groups having reactivity to an isocyanate group (hereinafter referred to as isocyanate reactive groups). In such a case, even though the molar ratio is low, the properties of the water/oil repellent agent may be impaired. Thus, the molar ratio of the isocyanate reactive groups in the compound (c) to the total amount of the isocyanate reactive groups in the isocyanate group-reactive compounds is preferably at most 0.4, particularly preferably at most 0.2. Further, as mentioned after, the compound (c) is preferably a compound having one isocyanate reactive group.

The compound (c) which is an isocyanate group-reactive compound other than the compound (a) and the compound (b) is not particularly restricted, so long as the compound (c) can be introduced in the water/oil repellent agent in the present invention by appropriately adjusting the content of the compound (c), the effects of the water/oil repellent agent of the present invention (the environmental impact is low, and the water/oil repellency is excellent) are not substantially impaired, and other properties can preferably be imparted. In other words, the compound (c) may be contained in the water/oil repellent agent within the range of the proportion such that the properties of the water/oil repellent agent are not impaired, although depending on its structure. Two or more types of the compound (c) may be used.

The compound (c) may, for example, be an alcohol which is not classified into the compound (a) and the compound (b) or a compound having an amino group which forms a urea bond by a reaction with an isocyanate group. Further, the compound (c) may be a blocking agent which blocks an isocyanate group. Further, the compound (c) may be water. An isocyanate group reacts with water to produce an amino group by hydrolysis, and the formed amino group further reacts with another isocyanate to form a urea bond, whereby a cross-linking structure can be introduced into a molecule.

The compound (c) of the present invention is preferably a compound having one alcoholic hydroxyl group or amino group. Particularly, the compound having one alcoholic hydroxyl group is preferred, since the solubility of the water/oil repellent agent in a medium can be improved. The compound having one alcoholic hydroxyl group may, for example, be a linear or branched alkyl alcohol having less than 18 carbon atoms, an alcohol having a functional group other than a hydroxyl group, an alcohol modified silicone or an alcohol having a polyoxyalkylene chain.

The compound having one alcoholic hydroxyl group as the compound (c) may, for example, be a monohydric alcohol such as methanol, ethanol, 1-propanol, 2-propanol, 1-butanol, 2-butanol, 2-methyl-1-butanol, tert-butanol, 1-hexanol, 2-ethylhexanol, 1-octanol, lauryl alcohol, cetyl alcohol, ethylene glycol monoacetate, propylene glycol monoacetate, diethylene glycol monoacetate, dipropylene glycol monoacetate, triethylene glycol monoacetate, polyethylene glycol monoacetate, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, polyethylene glycol monoethyl ether, hydroxyacetone, 4-hdyroxy-2-butanone or one terminal alcohol modified silicone.

The compound having one amino group may, for example, be methylamine, ethylamine, propylamine, butylamine, hexylamine, octylamine, dodecylamine, cetylamine, stearylamine, behenylamine, diethylamine or dibutylamine.

Further, the compound (c) may be a compound or blocking agent having plural isocyanate reactive groups such as alcoholic hydroxyl groups or amino groups. Particularly, a polyhydric alcohol or blocking agent is preferred. The polyhydric alcohol may, for example, be ethylene glycol, propylene glycol, trimethylene glycol, 1,4-butanediol, 2,3-butanediol, 1,5-pentanediol, 1,6-hexanediol, diethylene glycol, triethylene glycol, tetraethylene glycol, polyethylene glycol, dipropylene glycol, glycerin, pentaerythritol, dipentaerythritol, a monosaccharide, a disaccharide or an oligosaccharide.

The compound having amino groups may, for example, be ethylene diamine or propylene diamine. The blocking agent may, for example, be 3,5-dimethyl pyrazole, acetoxime, methylethylketoxime, benzophenoneoxime, thiophenol, hydroxylamine, a primary amino mercaptan or a secondary amino mercaptan. Particularly preferred is methylethylketoxime or 3,5-dimethylpyrazole.

The compound (d) is at least one polyisocyanate selected from the group consisting of a diphenylmethane diisocyanate and a polymethylene polyphenyl polyisocyanate. Hereinafter, "diphenylmethane diisocyanate" is referred to as MDI, and "polymethylene polyphenylisocyanate" is referred to as polymeric MDI.

The compound (d) is preferably polymeric MDI. The polymeric MDI is usually produced by converting amino groups of a crude diaminophenylmethane (including a polyamine compound having at least 3 functional groups) obtained by a condensation reaction of a formaldehyde and aniline to isocyanate groups to produce a crude MDI, followed by separation purification of the crude MDI from MDI. The polymeric MDI usually contains from 10 to 50 mass % of MDI. If the content of MDI in the polymeric MDI is high, the solubility deteriorates. As the compound (d), a polymeric MDI having a MDI content of from 10 to 30 mass % is preferred. Further, as the compound (d), a polymeric MDI having an isocyanate group content of from 30 to 33 mass % is preferred.

The method for producing a water/oil repellent agent of the present invention is a production method such that the compound (d) is reacted to the isocyanate group-reactive compounds sequentially or to a mixture containing the isocyanate group-reactive compounds. A catalyst or a reaction solvent may be optionally used for the reaction.

A reaction product of the isocyanate group-reactive compounds and the compound (d) preferably has no isocyanate group. When the isocyanate group-reactive compounds contain a compound having at least 2 isocyanate reactive groups, a part of the isocyanate reactive groups may remain in the reaction product. When the isocyanate group-reactive compounds consist of only compounds having one isocyanate reactive group, a reaction product is considered to have no isocyanate reactive group. However, the reaction product may contain a compound which is reactive to an unreacted isocyanate group. It is preferred that the unreacted compound (d) is not contained. Thus, the molar ratio of the total amount of isocyanate reactive groups in the isocyanate group-reactive compounds to the total amount of isocyanate groups in the compound (d) is preferably approx. 1/1.

In a case where an unreacted isocyanate group reactive-compound remains, the remaining compound is preferably the compound (c). When the remaining compound (c) can be used as a liquid medium for the after-mentioned water/oil repellent composition, even though the remaining amount of the compound (c) is large, problems do not occur. In a case where a reaction product having no isocyanate group is to be produced, such a reaction product may be produced by controlling the ratio of the isocyanate reactive groups and the isocyanate groups as mentioned above, or the desired reaction product may be produced by the method such that isocyanate groups in a produced reaction product are measured, and when the isocyanate groups are detected, the compound (c) or the like is added, until the isocyanate groups will not be detected.

As a catalyst for producing the reaction product, a tertiary amine (such as triethylene diamine, bis(2-dimethylaminoethyl)ether or N,N,N',N'-tetramethylhexamethylene diamine), a carboxylic metal salt (such as potassium acetate or potassium 2-ethylhexanate) or an organic metal compound (such as dibutyl tin dilaurate) may be used. Particularly, dibutyl tin dilaurate is preferred. The amount of the catalyst is preferably from 0.001 to 1 part by mass per 100 parts by mass of the reaction materials.

As a reaction solvent, a halogen compound, a hydrocarbon, a ketone, an ester or an ether may, for example, be used.

The halide compound may, for example, be a hydrocarbon halide or an ether halide. The hydrocarbon halide may, for example, be a hydrochlorofluorocarbon, a hydrofluorocarbon or a hydrocarbon chloride. The hydrochlorofluorocarbon may, for example, be $CH_3CCl_2F$, $CHCl_2CF_2CF_3$ or $CHClFCF_2CClF_2$. The hydrofluorocarbon may, for example, be $CF_3CHFCHFCF_2CF_3$, $CH_3(CF_2)_4CHF_2$, $CF_3CF_2CF_2CH_2CH_2CH_3$, $CF_3(CF_2)_5CH_2CH_3$ or 1,1,2,2,3,3,4-heptafluorocyclopentane.

The halogenated ether may, for example, be a hydrofluoroalkyl ether, a hydrofluoro(alkylalkenyl ether) or a hydrofluorocyclic ether. The hydrofluoroalkyl ether may, for example, be a separation-type hydrofluoroalkyl ether or a non-separation-type hydrofluoroalkyl ether. The separation-type hydrofluoroether is a compound having an $R^F$ group bonded to one side of an etheric oxygen atom, and an alkyl group bonded to the other side of the etheric oxygen atom. The non-separation-type hydrofluoroalkyl ether is a compound having partially fluorinated alkyl groups bonded to both sides of an etheric oxygen atom.

The separation-type hydrofluoroether may, for example, be $CF_3CF_2CF_2CF_2OCH_3$, $(CF_3)_2CFCF_2OCH_3$, $CF_3CF_2CF_2CF_2OCH_2CH_3$, $(CF_3)_2CFCF_2OCH_2CH_3$, $CF_3CF_2CF(OCH_3)CF(CF_3)_2$, $CF_3CF_2CF(OCH_2CH_3)CF(CF_3)_2$ or $C_3H_7OCF(CF_3)CF_2OCH_3$. The non-separation-type hydrofluoroalkyl ether may, for example, be $CHF_2CF_2OCH_2CF_3$ or $CF_3CF_2CH_2OCF_2CHF_2$. The hydrocarbon chloride may, for example, be methylene chloride, chloroform, 1,1,1-trichloroethane, dichloroethylene, trichloroethylene or tetrachloroethylene.

The hydrocarbon may, for example, be an aliphatic hydrocarbon, an alicyclic hydrocarbon or an aromatic hydrocarbon. The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane or hexadecane. The alicyclic hydrocarbon may, for example, be cyclopentane, methylcyclopentane, cyclohexane, metlhylcyclohexane or ethylcyclohexane.

The aromatic hydrocarbon may, for example, be benzene, toluene or xylene.

The ketone may, for example, be acetone, methyl ethyl ketone, 2-pentanone, 3-pentanone, 2-hexanone or methyl isobutyl ketone (hereinafter referred to as MIBK).

The ester may, for example, be methyl acetate, ethyl acetate, butyl acetate, methyl propionate, methyl lactate, ethyl lactate or pentyl lactate.

The ether may, for example, be an alkyl ether such as methyl tert-butyl ether, diisopropyl ether or cyclopentylmethyl ether or a cyclic ether such as dioxane or tetrahydrofuran.

Particularly, from the viewpoint of the solubility, chloroform, methylethylketone, MIBK or cyclohexane is preferred.

In the method for producing the reaction product, the concentration of a mixture of starting materials in a solvent is preferably from 5 to 80 mass %. The reaction is preferably carried out under a dehydrated condition to suppress side reactions. The reaction temperature is from 0 to 200° C., preferably from 40 to 100° C. The reaction time is preferably from 1 to 24 hours.

The termination of the reaction can be confirmed by disappearance of a peak around 2280 cm$^{-1}$ derived from the isocyanate group measured by Fourier transform infrared spectroscopy (FT-IR). For example, the termination of the reaction can be confirmed by dropping one drop of a reaction solution on a KBr cell, sandwiching the cell and measuring it by a transform type FT-IR. The termination of the reaction can also be confirmed by taking a part of the reaction solution, vacuum-drying it to remove a solvent and to obtain a solid of the reaction product, and measuring the solid reaction product by a reflective type FT-IR. The water/oil repellent agent of the present invention is preferably a reaction product containing no isocyanate group (namely, the isocyanate group is not detected by the above measurement).

The water/oil repellent composition of the present invention is a composition containing the above water/oil repellent agent, a liquid medium, and as a case requires a surfactant and an additive. The form of the water/oil repellent composition of the present invention is preferably a form wherein the water/oil repellent agent is dissolved in a liquid medium, or the water/oil repellent agent is dispersed in the form of fine particles.

The water/oil repellent composition of the present invention is produced by the following method (i), (ii), (iii) or (iv).

(i) A method of obtaining a solution of the water/oil repellent agent by the method using the above reaction solvent, followed by adding another liquid medium, and as a case requires, an additive.

(ii) A method of obtaining a solution of the water/oil repellent agent by the method using the above reaction solvent, followed by separating the water/oil repellent agent and adding a liquid medium and as a case requires, an additive, to the water/oil repellent agent.

(iii) A method of obtaining a solution of the water/oil repellent agent by the method using the above reaction solvent, followed by adding another liquid medium and a surfactant, and as a case requires an additive, and as a case requires removing the solvent.

(iv) A method of obtaining a solution of the water/oil repellent agent by the method using the above reaction solvent, followed by separating the water/oil repellent agent, adding a liquid medium and a surfactant and as a case requires, an additive, to the water/oil repellent agent, and as a case requires, removing the solvent.

As the liquid medium used in the present invention, specifically, in addition to the above-mentioned reaction solvent, water, an alcohol, a glycol, a glycol ether, a nitrogen compound or a sulfur compound may be mentioned. In a case where the water/oil repellent composition is a solution, particularly from the viewpoint of the solubility and the handling efficiency, a halogenated compound, a ketone or an ester is preferred. In a case where the water/oil repellent composition is a dispersion, particularly from the viewpoint of the solubility and the handling efficiency, at least one medium selected from the group consisting of water, an alcohol, a glycol and a glycol ether is preferred.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-petanol, 4-methyl-2-pentanol, 2-ethyl-1-butanol, 1-heptanol, 2-heptanol or 3-heptanol.

The glycol or the glycol ether, may, for example, be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, propylene glycol, propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol or hexylene glycol.

The nitrogen compound may, for example, be pyridine, N,N-dimethylformamide, N,N-dimethylacetamide or N-methylpyrolidone. The sulfur compound may, for example, be dimethylsulfoxide or sulfolane.

In a case where the water/oil repellent agent is dissolved in a liquid medium, according to the preferred method for producing the water/oil repellent composition, the solid component concentration of the water/oil repellent agent is adjusted to be from 5 to 80 mass % in the solution (100 mass %).

Further, the solid component concentration is a concentration including in addition to the water/oil repellent agent, a surfactant (emulsifier). Here, the solid component concentration is calculated from the mass of the dispersion before heating and the mass after heating for 4 hours at 120° C. by a counter current canal dryer.

In order to use a reaction solution containing the water/oil repellent agent obtained by the above-described method for producing a water/oil repellent agent of the present invention as a water/oil repellent composition of the present invention, a diluent component or the like is added to the water/oil repellent agent to adjust the concentration of the water/oil repellent composition preferably to from 0.05 to 10 mass %, more preferably from 0.1 to 5 mass %.

In a case where the water/oil repellent composition of the present invention is in the form of a dispersion, a usual method is employed such that a water/oil repellent agent or a solution containing a water/oil repellent agent, a surfactant and optional components are weighed and stirred uniformly with an appropriate amount of a solvent by a homomixer, a high pressure emulsifying machine or the like to obtain a dispersion.

The average particle size of the water/oil repellent agent in the dispersion type water/oil repellent composition is preferably from 10 to 1000 nm, more preferably from 10 to 300 nm, particularly preferably from 10 to 250 nm. When the average particle size is within the above range, it is not necessary to use a large amount of a surfactant, etc., the water repellency is excellent, color failing is prevented in treatment of dyed clothes, etc., and the dispersion particles are stably present in a solvent and free from precipitation. The average particle size of the dispersion is measured by a dynamic light scattering apparatus, an electronic microscope or the like, and the above average particle size is one measured by a dynamic light scattering apparatus.

Further, conditions such as the type and amount of a surfactant, the rotational rate of a homomixer and the pressure at the time of high pressure emulsification are controlled so that the water/oil repellent agent can be dispersed within the above-mentioned preferred range of the particle size.

The surfactant may, for example, be a hydrocarbon type surfactant or a fluorinated surfactant, and each may, for example, be an anionic surfactant, a nonionic surfactant, a cationic surfactant, or an amphoteric surfactant.

As the surfactant, from the viewpoint of the dispersion stability, it is preferred to use a nonionic surfactant and a cationic surfactant or an amphoteric surfactant in combination or to use an anionic surfactant alone, and it is more preferred to use a nonionic surfactant and a cationic surfactant in combination.

The total amount of the surfactants is preferably from 1 to 20 parts by mass, more preferably from 1 to 15 parts by mass per 100 parts by mass of the compound (c).

The additives include, for example, a penetrant, a defoamer, a water-absorbing agent, an antistatic agent, an antistatic polymer, an anticrease agent, a texture-adjusting agent, a film-forming assistant, a water-soluble polymer (such as polyacrylamide or polyvinyl alcohol,), a thermosetting agent (such as a melamine resin, a urethane resin, a triazine ring-containing compound or an isocyanate-type compound), an epoxy curing agent (such as isophthalic acid dihydrazide, adipic acid dihydrazide, dodecanedioic acid dihydrazide, 1,6-hexamethylenebis(N,N-dimethylsemicarbazide) or 1,1,1',1'-tetramethyl-4,4'-(methylene-di-p-phenylene) disemicarbazide or spiroglycol), a thermosetting catalyst, a cross linking catalyst, a synthetic resin, a fiber-stabilizer or inorganic fine particles.

The water/oil repellent composition of the present invention may contain a copolymer capable of exhibiting water repellency and/or oil repellency (e.g. a commercially available water repellent, a commercially available oil repellent, a commercially available water/oil repellent) or a water-repellent compound having no fluorine atom, as the case requires. The water-repellent compound having no fluorine atom may, for example, be a paraffin type compound, an aliphatic amide type compound, an alkylethylene urea compound or a silicone compound.

Articles to be treated with the water/oil repellent composition of the present invention are not particularly restricted, and various examples can be mentioned. Articles to be treated with the water/oil repellent composition of the present invention include, for example, fibers (natural fibers, synthetic fibers, mixed fibers, etc.), various fiber products, nonwoven fabrics, resins, paper, leather, metals, stones, concrete, gypsum and glass. As preferred applications, carpets, curtains, wallpaper and interior equipments for automobiles may, for example, be mentioned.

The treating method may, for example, be a method of coating or impregnating an article with the water/oil repellent composition by a known coating method, followed by drying. Further, antistatic finish, softening finish, antibacterial finish, deodorant finish or waterproofing finish may, for example, be carried out. The waterproofing finish may be processing to provide a waterproofing film. The waterproofing film may, for example, be a porous film made of an urethane resin or an acrylic resin, a non-porous film made of an urethane resin or an acrylic resin, a polytetrafluoroethylene film or a moisture-proofing film made of a combination thereof.

The water/oil repellent agent of the present invention comprises a reaction product obtained by reacting a fluoromonool having a polyfluoroalkyl moiety having at most 6 carbon atoms as an alcohol, and an alkane monool having at least 18 carbon atoms, with MDI or polymeric MDI. The environmental impact of the water/oil repellent agent of the present invention is low, and by treating an article with the water/oil repellent agent of the present invention, a sufficient water/oil repellency can be imparted. By treating the above-mentioned articles with the water/oil repellent composition of the present invention, a high quality water/oil repellency can be imparted to the articles.

EXAMPLES

Now, the present invention will be described in further detail with reference to Examples, Comparative Examples and Reference Examples. However, it should be understood that the present invention is by no means restricted to such specific Examples.

Further, in Table, symbol (A) or (B) given after "Alcohol" means that such an alcohol is classified into the above-mentioned alcohol (a) or (b), and other alcohols are represented by symbol (C).

Examples 1 to 14

Water/oil repellent agents of Examples 1 to 14 were prepared by the following method.

Into a 300 mL glass reactor provided with a stirrer and a dropping funnel, a polyisocyanate compound in an amount shown in Table 1, dibutyl tin dilaurate as a catalyst in an amount shown in Table 1 and a solvent in an amount shown in Table 1 were charged and stirred. Then, the internal temperature of the reactor was raised to 65° C. (in a case where the solvent was chloroform) or 80° C. (in a case where the solvent was MIBK), alcohols (a) to (c) in amounts shown in Table 1 were sequentially dropped, and the mixture was stirred for 3 hours to obtain a reaction solution containing a fluorourethane compound as a reaction product. Further, since the alcohol (b) was solid at room temperature, the dropping funnel was heated by a ribbon heater so that the alcohol (b) could be dropped as liquid. After the termination of the reaction, disappearance of a peak of the isocyanate group was confirmed by examining the reaction solution by FT-IR.

Comparative Examples 1 to 17

Water/oil repellent agents of Comparative Examples 1 to 17 wherein one of the essential components of the water/oil repellent agent of the present invention is not contained were produced in the same manner as in the above Examples.

In Table 1, mol % of each alcohol component represents mol fraction (%) to the total isocyanate (100 mol %).

Further, abbreviations of compounds are as follows.

Polyisocyanate compound (compound (d), etc.)

MDI: diphenylmethane diisocyanate (manufactures by TOKYO CHEMICAL INDUSTRY CO., LTD.)

M-200: Cosmonate M-200 (manufactured by MITSUI CHEMICALS POLYURETHANES, INC., polymeric MDI, content of isocyanate groups: 31.5 mass %, content of MDI: 33 to 43 mass %).

M-1500: Cosmonate M-1500 (manufactured by MITSUI CHEMICALS POLYURETHANES, INC., polymeric MDI, content of isocyanate groups: 31.0 mass %, content of MDI: from 15 to 25 mass %).

N-3200: Desmodur N-3200 (manufactured by Sumika Bayer Urethane Co., Ltd., HDI biuret, content of isocyanate groups: 22.7 mass %).

D-103H: Takenate D-103H (manufactured by MITSUI CHEMICALS POLYURETHANES, INC., TDI adduct, 75.6 mass % ethyl acetate solution, content of isocyanate groups: 12.9 mass %).

D-204: Takenate D-204 (manufactured by MITSUI CHEMICALS POLYURETHANES, INC., TDI nurate, 50.0 mass % butyl acetate solution, content of isocyanate groups: 7.38 mass %).

HDI: hexamethylene diisocyanate
TDI: tolylene diisocyanate
Alcohol A (compound (a))
C6AL: $C_6F_{13}CH_2CH_2OH$
Alcohol B (compound (b))
StOH: stearyl alcohol
BeOH: behenyl alcohol
Alcohol C (compound (c))
MHEK: 4-hydroxy-2-butanone
Reaction solvent
MIBK: methylisobutylketone Reference Examples As a reference example, a water/oil repellent composition AG-3001 (manufactured by Asahi Glass Company, Limited) which is excellent in a water/oil repellency and has a urethane compound having an $R^F$ group having at least 8 carbon atoms as an active ingredient was used. 5 g of an emulsion of AG-3001 was dropwise added to 50 g of 2-propanol (hereinafter referred to as IPA), and the mixture was stirred and precipitated as solid.

The mixture was centrifuged at 3000 rpm for 5 minutes, and the obtained solid was decanted. 12 g of IPA was added again, and the mixture was sufficiently stirred. After centrifugal separation at 3000 rpm for 5 minutes, the obtained solid was separated from a supernatant liquid and vacuum dried at 35° C. for overnight to obtain a fluorourethane compound.

TABLE 1

| | | Polyisocyanate compound | | Alcohol A | | | Alcohol B | | | Alcohol C | | | Catalyst | Solvent | |
|---|---|---|---|---|---|---|---|---|---|---|---|---|---|---|---|
| | Ex. No. | abbreviation | mass (g) | abbre-viation | mass (g) | mol % | abbre-viation | mass (g) | mol % | abbre-viation | mass (g) | mol % | mass (mg) | abbreviation | mass (g) |
| Ex. | 1 | CN M-200 | 5.0 | C6AL | 10.2 | 75 | StOH | 2.5 | 25 | | | | 2.6 | Chloroform | 156 |
| | 2 | CN M-200 | 5.0 | C6AL | 8.2 | 60 | StOH | 4.1 | 40 | | | | 2.6 | Chloroform | 155 |
| | 3 | CN M-200 | 3.0 | C6AL | 4.1 | 50 | StOH | 3.0 | 50 | | | | 1.6 | Chloroform | 91 |
| | 4 | CN M-200 | 4.0 | C6AL | 8.2 | 75 | BeOH | 2.5 | 25 | | | | 2.1 | Chloroform | 132 |
| | 5 | CN M-200 | 5.0 | C6AL | 5.9 | 60 | BeOH | 3.5 | 40 | | | | 1.9 | MIBK | 130 |
| | 6 | CN M-200 | 3.0 | C6AL | 4.1 | 50 | BeOH | 3.7 | 50 | | | | 1.6 | Chloroform | 97 |
| | 7 | CN M-200 | 3.0 | C6AL | 2.1 | 25 | BeOH | 5.5 | 75 | | | | 1.6 | Chloroform | 95 |
| | 8 | CN M-1500 | 30.0 | C6AL | 48.4 | 60 | BeOH | 28.9 | 40 | | | | 15.4 | MIBK | 72 |
| | 9 | CN M-1500 | 30.0 | C6AL | 40.3 | 50 | BeOH | 36.1 | 50 | | | | 15.4 | MIBK | 71 |
| | 10 | CN M-200 | 10.0 | C6AL | 13.7 | 50 | BeOH | 7.4 | 30 | MHEK | 1.3 | 20 | 5.2 | MIBK | 129 |
| | 11 | CN M-200 | 8.0 | C6AL | 13.8 | 63 | BeOH | 5.3 | 27 | MHEK | 0.5 | 10 | 4.2 | MIBK | 110 |
| | 12 | CN M-200 | 10.0 | C6AL | 14.7 | 54 | BeOH | 8.8 | 36 | MHEK | 0.7 | 10 | 5.2 | MIBK | 137 |
| | 13 | CN M-200 | 30.0 | C6AL | 36.9 | 45 | BeOH | 33.1 | 45 | MHEK | 2.0 | 10 | 15.6 | MIBK | 68 |
| | 14 | MDI | 8.0 | C6AL | 11.7 | 50 | BeOH | 10.5 | 50 | | | | 4.4 | MIBK | 120 |
| Comp. Ex. | 1 | CN M-200 | 8.0 | C6AL | 21.8 | 100 | | | | | | | 4.2 | MIBK | 119 |
| | 2 | CN M-200 | 8.0 | | | | StOH | 16.2 | 100 | | | | 4.2 | MIBK | 97 |
| | 3 | CN M-200 | 3.0 | | | | BeOH | 7.4 | 100 | | | | 1.6 | Chloroform | 93 |
| | 4 | MDI | 8.0 | C6AL | 23.3 | 100 | | | | | | | 4.4 | MIBK | 125 |
| | 5 | DM N-3200 | 30.0 | C6AL | 59.0 | 100 | | | | | | | 11.3 | MIBK | 22 |
| | 6 | DM N-3200 | 10.0 | C6AL | 9.8 | 50 | StOH | 7.3 | 50 | | | | 3.8 | MIBK | 109 |
| | 7 | DM N-3200 | 10.0 | | | | StOH | 14.6 | 100 | | | | 3.8 | MIBK | 98 |
| | 8 | DM N-3200 | 5.0 | C6AL | 7.4 | 75 | BeOH | 2.2 | 25 | | | | 1.9 | Chloroform | 131 |
| | 9 | DM N-3200 | 5.0 | C6AL | 5.5 | 60 | BeOH | 3.5 | 40 | | | | 1.9 | Chloroform | 130 |
| | 10 | DM N-3200 | 5.0 | C6AL | 4.9 | 50 | BeOH | 4.4 | 50 | | | | 1.9 | Chloroform | 129 |
| | 11 | DM N-3200 | 5.0 | C6AL | 3.9 | 40 | BeOH | 5.3 | 60 | | | | 1.9 | Chloroform | 128 |
| | 12 | DM N-3200 | 5.0 | C6AL | 2.5 | 25 | BeOH | 6.6 | 75 | | | | 1.9 | Chloroform | 127 |
| | 13 | DM N-3200 | 5.0 | | | | BeOH | 8.8 | 100 | | | | 1.9 | Chloroform | 124 |
| | 14 | TN D-103H | 15.0 | C6AL | 16.8 | 100 | | | | | | | 3.2 | MIBK | 109 |
| | 15 | TN D-103H | 15.0 | C6AL | 8.4 | 50 | BeOH | 7.5 | 50 | | | | 3.2 | MIBK | 105 |
| | 16 | TN D-204 | 25.0 | C6AL | 16.0 | 100 | | | | | | | 3.1 | MIBK | 101 |
| | 17 | TN D-204 | 25.0 | C6AL | 8.0 | 50 | BeOH | 7.2 | 50 | | | | 3.1 | MIBK | 98 |

Evaluation 1

Sample plates were prepared by the following method by using the respective reaction solutions obtained in Examples 1 to 14 and Comparative Examples 1 to 17 and the water/oil repellent agent of the Reference Example, and the water/oil repellency was evaluated.

Preparation of Sample Plates

The obtained reaction solution was diluted with chloroform to a solid content concentration of 1.0 mass % to obtain a treating liquid. Then, a coating film was formed on a glass plate by using each treating liquid by the following method, and the water/oil repellency of the coating film was evaluated. Results are shown in Table 2.

TABLE 2

| Ex. No. | | Evaluation 1 Contact angle | Evaluation 2 Water repellency | Oil repellency |
|---|---|---|---|---|
| Ex. | 1 | 113 | 90− | 6 |
| | 2 | 113 | 90 | 6− |
| | 3 | 112 | 80+ | 6− |
| | 4 | 112 | 90 | 6 |
| | 5 | 112 | 90 | 6− |
| | 6 | 112 | 90 | 6− |
| | 7 | 108 | 80+ | 2+ |
| | 8 | 113 | 90 | 6− |
| | 9 | 114 | 90 | 6− |
| | 10 | 110 | 80+ | 5 |
| | 11 | 114 | 80+ | 6− |
| | 12 | 112 | 90− | 6− |
| | 13 | 113 | 90 | 6− |
| | 14 | 112 | 90 | 2− |
| Comp. Ex. | 1 | 112 | 80 | 6 |
| | 2 | 93* | 80− | 0+ |
| | 3 | 97* | 70+ | 1− |
| | 4 | 108 | 70+ | 3 |
| | 5 | 58* | 70+ | 6 |
| | 6 | 100* | 70− | 3+ |
| | 7 | 90* | 80− | 3 |
| | 8 | 88* | 80− | 5+ |
| | 9 | 106* | 80− | 6− |
| | 10 | 102* | 80 | 6− |
| | 11 | 102* | 80 | 4− |
| | 12 | 93* | 80 | 3− |
| | 13 | 98* | 80− | 1− |
| | 14 | 94* | 70+ | 5 |
| | 15 | 102* | 80− | 4+ |
| | 16 | 103* | 70+ | 2 |
| | 17 | 18 | 80− | 1 |
| Reference Ex. (AG-3001) | | 111 | 90 | 6 |

Measurement of Contact Angle

Using a cleaned glass plate as a substrate, the treating liquid obtained as described above, was applied thereon by a spin coating method for 10 seconds under a condition of 1,000 rpm. Then, by heat treatment at 120° C. for 60 minutes, a coating film was formed to obtain a test plate. With respect to all of the above treating liquids, test plates having such a coating film formed by using them, were prepared. By using each test plate thus obtained, the contact angle of water on such a coating film was measured, and thus, water and oil repellency of the coating film obtained from the treating liquid containing the copolymer prepared in each of the above Examples and Comparative Examples was evaluated. Here, the measurement of the contact angles was carried out by using CA-X manufactured by KYOWA INTERFACE SCIENCE CO., LTD.

In Table, values of the contact angle provided with * are not accurate values, since droplets on the coating film spread during the measurement. Further, what droplets spread means that the water repellency was insufficient.

It is evident from these results that a coating film having a high water repellency can be prepared with a treating liquid (water repellent composition) containing the water/oil repellent agent of the present invention, as compared to treating liquids (water repellent compositions) containing the water/oil repellent agent of Comparative Examples which does not contain one of constituting components of the water/oil repellent agent of the present invention. Further, by using a treating liquid (water repellent composition) containing the water/oil repellent agent of the present invention, a sufficient water repellency can be imparted to an article, and environmental impact is also low.

Evaluation 2

With respect to each of the reaction solution obtained in the above Examples 1 to 14 and Comparative Examples 1 to 17, a test cloth was prepared, and the water repellency and the oil repellency were evaluated by the following methods. The results are shown in Table 2.

Preparation of Test Cloth

The obtained reaction solution was diluted with chloroform so that the solid content concentration became 0.6 mass % to obtain a test liquid. A polyester cloth was dipped in such a test liquid and squeezed so that the wet pick up became 120 mass %. It was dried at normal temperature for 24 hours and further dried at 170° C. for 60 seconds to obtain a test cloth.

Evaluation of Water Repellency

The water repellency of the test cloth was evaluated in accordance with JIS-L1092 spray test, and the water repellency was represented by the water repellency grade shown in Table 3. Here, the water repellency grade followed by +(−) indicates that such an evaluation is slightly higher (lower).

TABLE 3

| Water repellency/ oil repellency | State |
|---|---|
| 100 | There is no moisture or water droplet on a surface |
| 90 | There is slight water droplets on a surface |
| 80 | There is moisture on a part of surface |
| 70 | There is moisture on half of a surface |
| 50 | There is moisture on the entire surface |
| 0 | Completely soaked |

Evaluation of Oil Repellency

In accordance with the test method of AATCC-TM118-1966, each of the test solutions shown in Table 4 was placed in the form of droplets (diameter: about 4 mm) at two portions on the test cloth prepared as described above, and the oil repellency was represented by the oil repellency grade shown in Table 3 depending upon the soaked state after 30 seconds. Here, the oil repellency grade followed by +(−) indicated that such an evaluation is slightly higher (lower).

TABLE 4

| Oil repellency grades | Test solutions | Surface tension mN/m (25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of Nujol/35 parts by hexadecane | 29.6 |
| 1 | Nujol | 31.2 |
| 0 | Lower than 1 | — |

From these results, it is evident that when an article is treated with a water/oil repellent composition containing the water/oil repellent agent of the present invention, an excellent water/oil repellency can be imparted as compared with the water/oil repellent compositions containing the water/oil repellent agent of Comparative Examples which does not contain one of the constituting components of the water/oil repellent composition of the present invention. Further, it is substantially equal to the water/oil repellent composition AG-3001 containing, as an active component, a copolymer containing polymerized units having an $R^F$ group having at least 8 carbon atoms, which has a high environmental burden.

INDUSTRIAL APPLICABILITY

The water/oil repellent agent or the water/oil repellent composition of the present invention is useful as a water/oil repellent agent for e.g. fiber products (clothing (sports wears, coats, jumpers, work clothes, uniforms, etc.), bags, carpets, curtains, wall papers, industrial materials, etc.), nonwoven fabrics, leather products, stone materials, concrete building materials, etc. Further, it is useful as a coating agent for filtration material or as a surface protective agent. Further, it is useful also for an application wherein it is mixed with e.g. polypropylene or nylon, followed by molding or forming into fibers to impart water/oil repellency.

This application is a continuation of PCT Application No. PCT/JP2010/060313, filed Jun. 17, 2010, which is based upon and claims the benefit of priority from Japanese Patent Application No. 2009-150022 filed on Jun. 24, 2009. The contents of those applications are incorporated herein by reference in its entirety.

What is claimed is:

1. A water/oil repellent agent comprising:
   a reaction product of isocyanate group-reactive compounds comprising a compound (a) and a compound (b) with a compound (d):
   compound (a): a fluoromonool represented by formula (1):

   $$R^f-Y-OH \quad (1)$$

wherein $R^f$ is a $C_{1-6}$ polyfluoroalkyl group, Y is a single bond, an alkylene group, an alkenylene group, or an alkylene group which has —O—, —CO—, —S—, $SO_2$—, or —$NR^1$-inserted between two carbon atoms or at an $R^f$ side end, wherein $R^1$ is a hydrogen atom or a $C_{1-4}$ alkyl group,
   compound (b): an alkane monool having at least 18 carbon atoms,
   compound (d): at least one polyisocyanate selected from the group consisting of a diphenylmethane diisocyanate and a polymethylenepolyphenyl polyisocyanate.

2. The water/oil repellent agent according to claim 1, wherein the molar ratio of the total of the compound (a) and the compound (b) to the total amount of the isocyanate group-reactive compounds is from 0.6 to 1.

3. The water/oil repellent agent according to claim 1, wherein the molar ratio of the compound (a) to the total amount of the compound (a) and the compound (b) is from 0.2 to 0.8.

4. The water/oil repellent agent according to claim 1, wherein the reaction product has no isocyanate group.

5. The water/oil repellent agent according to claim 1, wherein the compound (a) is at least one polyfluoroalkane monool having a $C_{4-6}$ perfluoroalkyl moiety.

6. The water/oil repellent agent according to claim 1, wherein the compound (b) is at least one $C_{20-24}$ linear alkane monool.

7. The water/oil repellent agent according to claim 1, wherein the compound (d) is a polymethylenepolyphenyl polyisocyanate having an isocyanate group content of from 30 to 33 mass %.

8. The water/oil repellent agent according to claim 1, wherein the isocyanate group-reactive compounds further comprises a compound (c), the compound (c) being other than the compound (a) and the compound (b):
   compound (c): a compound having one alcoholic hydroxyl group or amino group.

9. A method for producing the water/oil repellent agent as defined in claim 1, wherein the compound (d) is reacted to the isocyanate group-reactive compounds sequentially or to a mixture containing the isocyanate group-reactive compounds.

10. A water/oil repellent composition comprising:
    the water/oil repellent agent as defined in claim 1; and
    a liquid medium.

11. The water/oil repellent agent according to claim 1, wherein Y is a linear or branched $C_{1-6}$ alkylene group or —$CR^2$=$CR^3$—, wherein each of $R^2$ and $R^3$ is independently a hydrogen atom or a methyl group.

12. The water/oil repellent agent according to claim 1, wherein Y is a $C_{2-4}$ polymethylene group.

13. The method according to claim 9, wherein the molar ratio of the compound (a) to the total amount of the compound (a) and the compound (b) is from 0.2 to 0.8.

14. The method according to claim 9, wherein the compound (a) is at least one polyfluoroalkane monool having a $C_{4-6}$ perfluoroalkyl moiety.

15. The method according to claim 9, wherein the compound (b) is at least one $C_{20-24}$ linear alkane monool.

16. The method according to claim 9, wherein the compound (d) is a polymethylenepolyphenyl polyisocyanate having an isocyanate group content of from 30 to 33 mass %.

17. The method according to claim 9, wherein Y is a linear or branched $C_{1-6}$ alkylene group or —$CR^2$=$CR^3$—, wherein each of $R^2$ and $R^3$ is independently a hydrogen atom or a methyl group.

18. The method according to claim 9, wherein Y is a $C_{2-4}$ polymethylene group.

* * * * *